United States Patent [19]

Onda

[11] Patent Number: 4,790,271
[45] Date of Patent: Dec. 13, 1988

[54] AUTO-DECOMPRESSION SYSTEM FOR ENGINES

[75] Inventor: Takanori Onda, Saitama, Japan

[73] Assignee: Honda Giken Kogyo Kabushiki Kaisha, Tokyo, Japan

[21] Appl. No.: 47,743

[22] Filed: May 8, 1987

[30] Foreign Application Priority Data

May 9, 1986 [JP] Japan ................................. 61-106398

[51] Int. Cl.$^4$ ............................................. F01L 13/08
[52] U.S. Cl. ................................. 123/182; 123/90.17
[58] Field of Search ..................... 123/182, 90.17, 316, 123/90.16

[56] References Cited

U.S. PATENT DOCUMENTS 4,651,687  3/1987  Yamashita et al. ................. 123/182

FOREIGN PATENT DOCUMENTS 865039  5/1941  France ............................... 123/182

Primary Examiner—Andrew M. Dolinar
Attorney, Agent, or Firm—Lyon & Lyon

[57] ABSTRACT

A valve control device including a decompression cam. The decompression cam fits loosely on the camshaft adjacent to a valve motion cam. The decompression cam may be selectively moved and retained so as to extend beyond the valve motion cam to control the associated cam follower during the compression stroke. An eccentric weight is associated with the decompression cam so as to draw it from an extension beyond the valve motion cam under normal operating conditions. When starting, a spring biases the decompression cam outwardly so as to interlock the cam with a projection associated with the camshaft. When the projection retains the decompression cam outwardly against the cam follower, an associated engine valve is partially open to reduce compression during the compression stroke. Further rotation releases the decompression cam from the projection and allows the centrifugal force operating on the eccentric weight to draw the decompression cam out of operation for normal running. A reverse, decompression cam operates by means of a one-way clutch to lift the associated cam follower when the engine rotates partially in reverse. When rotating normally, the reverse, decompression cam is declutched from the camshaft and remains inoperative.

14 Claims, 5 Drawing Sheets

AUTO-DECOMPRESSION SYSTEM FOR ENGINES

BACKGROUND OF THE INVENTION

The field of the present invention is mechanisms for valve actuation in engines.

Decompression devices have been developed which are employed to reduce the forces required to start an engine. Such devices typically reduce the pressure within the combustion chamber during a first compression stroke by maintaining an intake or exhaust valve partially open during that portion of the initial engine cycle. Such an operation enables additional angular momentum to be established in the engine, such that during the successive cycle or cycles the engine is turning over fast enough to complete a second compression cycle and successfully ignite the charge in the combustion chamber.

Typically such decompression devices employ a mechanism separate and apart from the normal valve opening and closing device as a means for retaining the selected valve partially open during compression. One example of such a device having a manual decompression mechanism is disclosed in Japanese Patent Application Publication No. 59-74317 (74317/1984). Another such a device employing a governor is illustrated in Japanese Patent Application No. 61-40715 (40715/1985).

SUMMARY OF THE INVENTION

The present invention is directed to an improved autodecompression device which is actuated during the initial engine cycle or cycles to reduce compression for ease of starting. The device is comparatively simple, requires a minimum number of parts and operates automatically. Assembly and maintenance is also enhanced.

To realize the foregoing, a decompression cam may be employed with a valve motion cam. The decompression cam may selectively extend outwardly of the valve motion cam during compression in the initial cycle. This partially opens an associated engine valve to relieve compression. To accomplish the foregoing, the decompression cam rides loosely on the camshaft. A retaining means can selectively keep the decompression cam extended during an initial compression stroke. An eccentric weight draws the decompression cam inwardly so as not to extend outwardly of the valve motion cam once a selected rotational speed is reached.

A reverse, decompression cam may also be employed with the decompression cam to provide decompression where the engine has reversed for a portion of a stroke. Such an event can occur, for example, when the engine stops part way through a compression stroke. To this end, a one-way clutch may be provided which moves a second cam member into position to open the associated engine valve as the reversing motion occurs.

Accordingly, it is an object of the present invention to provide an improved decompression device for starting internal combustion engines. Other and further objects and advantages will appear hereinafter.

BRIEF DESCRIPTION OF THE DRAWINGS

In the drawings, similar reference characters denote similar elements throughout the several views.

DETAILED DESCRIPTION OF THE PREFERRED EMBODIMENTS

Figure 1:
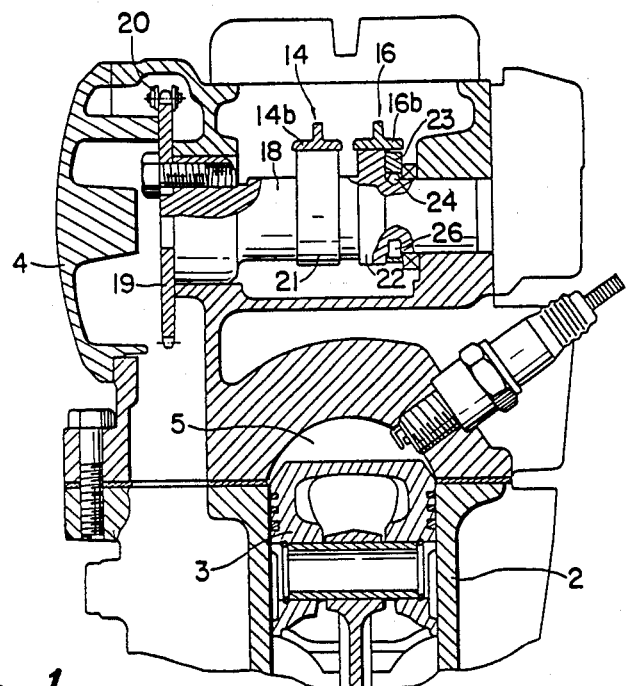
FIG. 1 is a cross-sectional side view of an engine illustrating a first embodiment of the present invention.
Figure 2:
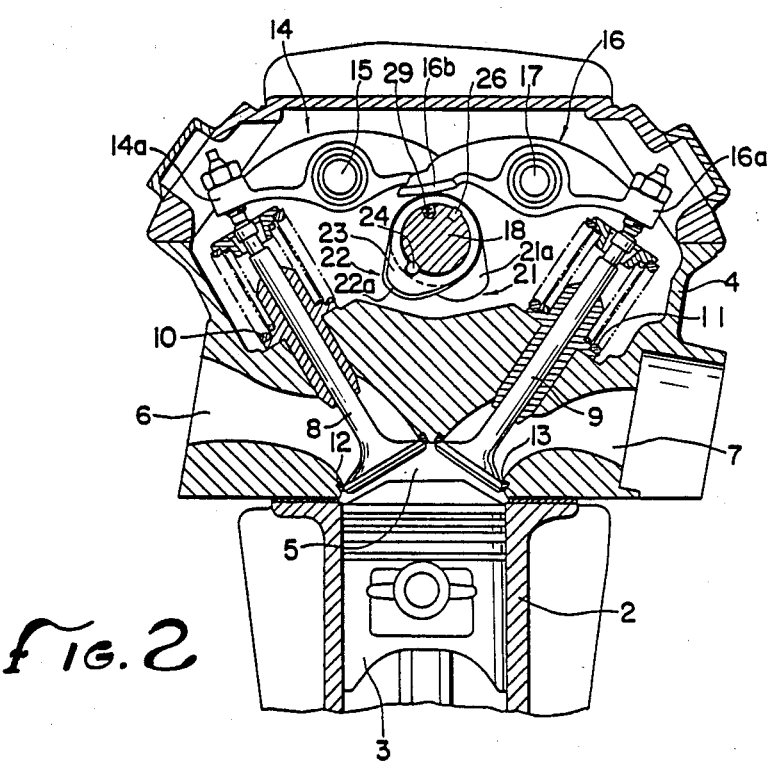
FIG. 2 is a cross-sectional side view of the engine of FIG. 1 turned 90 degrees from the view of FIG. 1.

Turning in detail to the drawings, a first embodiment of the present invention is illustrated in FIGS. 1 through 6. An engine is shown to include a cylinder block 2, a reciprocating piston 3 and a cylinder head 4. The block 2, piston 3 and head 4 define a combustion chamber 5. The cylinder head 4 includes an inlet passage 6 and an exhaust passage 7 which extend to the combustion chamber 5. An inlet valve 8 is arranged in the inlet passage 6 and an exhaust valve 9 is arranged in the exhaust passage 7 to control communciation with the combustion chamber 5. The engine valves 8 and 9 are shown to be inclined away from one another to lie in the roof of the combustion chamber and to provide a space between the valves above the combustion chamber. Around each of the upper portions of the valves 8 and 9 are valve springs 11 and 12, respectively, provided in compression to bias the valves toward closed positions.

A rocker arm 14 is pivotally mounted relative to the cylinder head 4 about a shaft 15. The rocker arm 14 extends to the upper end of the valve 8 at a valve engaging portion 14a. Similarly, a rocker arm 16 is pivotally mounted relative to the cylinder head 4 about a shaft 17. The rocker arm 16 extends to a valve engaging portion 16a associated with the upper end of the valve 9. Centered between the valves is a camshaft 18. The camshaft 18 rotates in a synchronous manner with the rotation of the crank shaft of the engine by means of a cam drive train including a sprocket 19 fixed to one end of the camshaft 18 and a cam chain 20 which extends to a second sprocket (not shown) associated with the crank shaft. Cooperating with the camshaft 18 are cam followers 14b and 16b of rocker arms 14 and 16, respectively. The cam followers 14b and 16b include slipper surfaces facing the cam surfaces of the camshaft 18. Thus, valve actuation mechanisms extend from the camshaft 18 outwardly to actuate the valves 8 and 9.

An inlet valve motion cam 21 is fixed on the camshaft 18 below the cam follower 14b of the rocker arm 14. Similarly, an exhaust valve motion cam 22 is fixed on the camshaft 18 below the cam follower 16b of the rocker arm 16. Through the valve actuation mechanism, interaction of the cam 21 with the rocker arm 14 operates to open the valve 8 during the intake stroke.

The cam 22 operates with the rocker arm 16 to actuate the exhaust valve 9 during the exhaust stroke.

Positioned adjacent to the exhaust valve motion cam 22 is a decompression cam 23 whose orientation on the camshaft 18 adjacent to the exhaust cam 22 is best illustrated in FIG. 1. The outer peripheral surface of the decompression cam 23 is shown to face the follower 16b. As can be seen in FIG. 1, the decompression cam 23 is smaller in radial extent than the adjacent cam 22. Thus, the decompression cam 23 may be positioned such that its entire periphery is inwardly of the projection of the adjacent surface of the cam 22.

Looking then to the more detailed FIGS. 3 through 6, the decompression cam 23 includes a base circle portion 23a which is a slightly smaller base circle than the base circle 22b of the exhaust valve motion cam 22. A weight portion 23b extends from the base circle 23a to one side such that the weight 23b is eccentric to the axis of the camshaft and, when rotated about the camshaft, will create a lateral force. The weight portion 23b is conveniently located where the cam lift 22a of the exhaust valve motion cam 22 extends outwardly from the base circle of the cam 22. The profile of the weight 23b is smaller than the cam lift 22a such that it will not interfere with the cam follower 16b. The inner bore 23c of the decompression cam 23 is formed with a slightly larger diameter than the camshaft 18 such that the decompression cam 23 is loosely fitting on the camshaft 18.

The portion of the camshaft 18 which loosely fits within the decompression cam 23 includes an engaging recess 25. The engaging recess 25 receives a ball-shaped engaging member 24. A recess 27 is arranged in the bore 23c of the decompression cam 23 to cooperate with the engaging member 24. The engaging member 24 forms an interlocking element between the two recesses 25 and 27 which prevents rotational movement therebetween. As can be seen by comparing FIGS. 3 and 6, one of the recesses, in this case the recess 27, does not grip the interlocking element 24 so that the decompression cam 23 may move radially with respect to the axis of the camshaft 18 and away from the interlocking element 24. Conveniently, the interlocking element 24 may be retained by interference or other means within the recess 25. Thus, a means is provided for rotationally interlocking the decompression cam 23 and the camshaft 18. In this way, the weight 23b as well as other features on the decompression cam 23 remain appropriately indexed relative to the camshaft 18. The interlocking element 24 is found adjacent the weight portion 23b.

Figure 3:
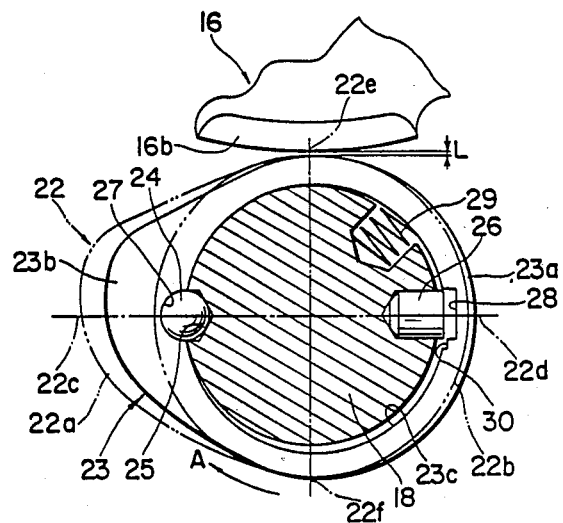
FIG. 3 is a cross-sectional view of a decompression device of the embodiment of FIG. 1 taken transversely through the camshaft and illustrating the exhaust valve motion cam positioned at the expansion stroke of the associated combustion chamber.

Substantially diagonally across the camshaft 18 from the rotational interlocking means is an engaging pin or projection 26. The projection 26 is shown to be fixed within the camshaft 18 so as to extend outwardly from the surface thereof. The projection 26 is generally flat with a sharp corner between the top and side surfaces. A groove or recess 28 is provided on the bore 23c of the decompression cam 23 to cooperate with the projection 26 extending from the camshaft 18. As can be seen in FIG. 3, the fit of the decompression cam 23 relative to the camshaft 18 is such that the decompression cam 23 may be radially displaced from the camshaft 18 at the projection 26 when the decompression cam 23 is against the camshaft 18 at the interlocking element 24.

Figure 6:
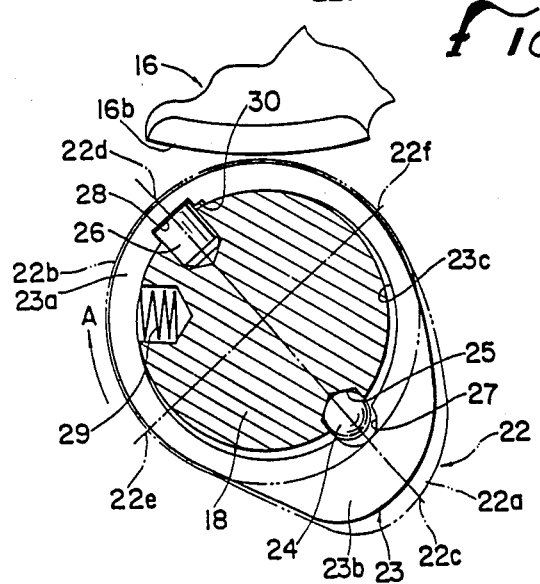
FIG. 6 is the same view as FIG. 3 with the cam positoned as in FIG. 4 during normal running.

A spring 29 located between the camshaft 18 and the decompression cam 23 biases the decompression cam away from the camshaft at the projection 26 as can be seen in FIG. 3. The spring 29 is arranged adjacent the projection 26 to one side so that the spring also biases the decompression cam toward the expansion stroke portion 22e of the exhaust valve motion cam 22. Under the influence of the spring 29, the base circle 23a of the decompression cam 23 projects radially beyond the base circle 22b of the exhaust valve motion cam 22 when free to do so. Thus, the decompression cam extends outwardly of the base circle at the compression stroke portion 22d of the cam 22. The spring 29 is sufficiently weak that when the camshaft is rotating, the force of the eccentric weight 23b can draw the decompression cam 23 into the position as seen in FIG. 6 without the surface of the decompression cam 23 extending outwardly of the main surface of the cam 22.

Adjacent the recess 28 is a shoulder 30 which is at a lesser depth than the recess itself. The shoulder 30 is arranged to receive the edge of the projection 26 as can best be seen in FIGS. 4 and 5 to act as a means for selectively retaining the decompression cam 23 displaced from the camshaft 18 at the compression stroke portion 22d of the exhaust valve motion cam 22. This retains the base circle 23a of the decompression cam 23 outwardly of the base circle 22b of the exhaust valve motion cam 22. The shoulder 30 is shown to be angularly spaced from the recess 28 on the side thereof toward the inlet stroke portion 22f of the exhaust valve motion cam 22.

The shoulder 30 is so formed that when it engages the projection 26, the base circle 23a of the decompression cam 23 projects outwardly to engage the cam follower 16b, spanning the tappet gap L formed between the base circle 22b of the exhaust valve motion cam 22 and the surface of the cam follower 16b of the rocker arm 16.

Looking in sequence to FIGS. 3 through 6, FIG. 3 illustrates a condition in which the engine is stopped as is the exhaust valve motion cam 22. The exhaust valve motion cam 22 is shown to be stopped at the expansion stroke position of the associated combustion chamber. The decompression cam 23 is shown displaced in the direction of the compression stroke portion 22d of the exhaust valve motion cam 22 as a result of the baising force of the spring 29. The base circle 23a is shown to project further out than the base circle 22b of the compression stroke portion 22d of the exhaust valve motion 22.

Figure 4:
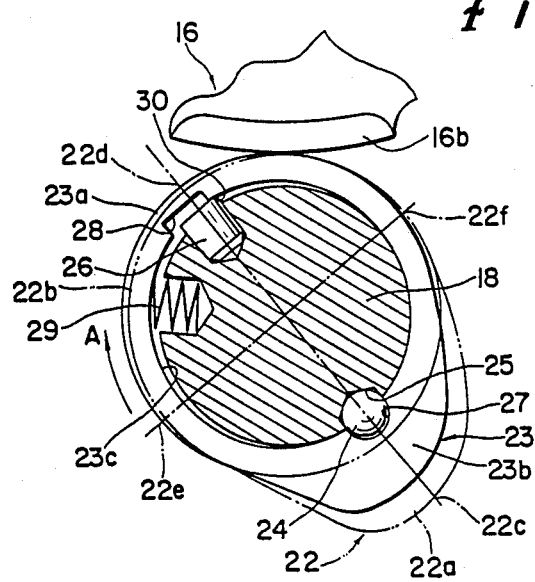
FIG. 4 illustrates the view of FIG. 3 with the exhaust valve motion cam at the initial compression stroke position.

If the engine is started from this position, the exhaust valve motion cam 22 and the decompression cam 23 rotate in the direction of the arrow A. The engine proceeds through a first exhaust stroke and a first inlet stroke. Further rotation brings the cam follower 16b to the compression stroke portion 22d of the exhaust valve motion cam 22. Under the influence of the spring 29, the base circle 23a of the decompression cam 23 projects outwardly of the base circle 22b of the exhaust valve motion cam 22. As the camshaft 18 continues to move, the cam follower 16b comes into contact with the decompression cam 23. As the cam continues to rotate, the decompression cam 23 is pivoted to the left, as seen in FIG. 4, about the interlocking element 24 which acts, in this instance, as a pivot point between the decompression cam 23 and the camshaft 18. With appropriate pivotal motion of the decompression cam 23, the projection 26 comes to engage the shoulder 30. With the shoulder thus engaged, the decompression cam is constrained from moving inwardly toward the camshaft 18 at that point.

Figure 5:
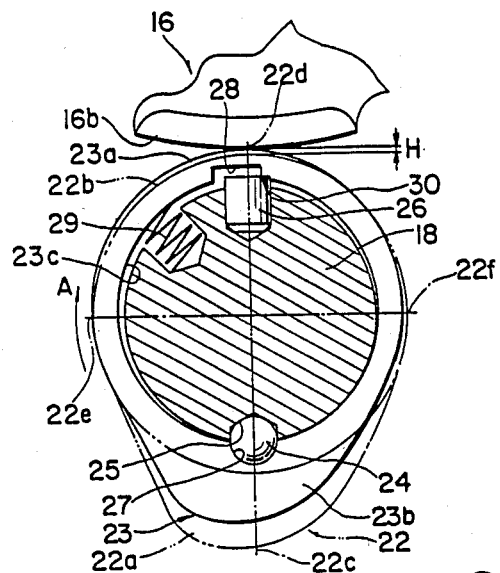
FIG. 5 illustrates the view of FIG. 3 with the exhaust valve motion cam at the middle compression stroke position.

As the camshaft 18 is further rotated, the compression stroke portion 22d of the exhaust valve motion cam 22 comes to beneath the cam follower 16b, as seen in FIG. 5. As the projection 26 continues to retain the decompression cam 30 in its extended position, the cam follower 16b is lifted from its rest position. The base circle of the decompression cam 23 extends outwardly from the base circle of the exhaust valve motion cam 22 by a height H. The height H is greater than the tappet gap L. Consequently, the exhaust valve is lifted from its seat and the pressure in the combustion chamber is reduced. This allows the starter mechanism to turn over the engine more quickly to build inertia for starting.

As the rotational speed increases, the decompression cam 23 is displaced in the direction of the exhaust stroke portion 22c of the exhaust valve motion cam 22 against the baising force of the spring 29. This occurs because of the centrifugal force of the eccentric weight portion 23b acting with the camshaft 18 in motion. As the camshaft 18 continues to rotate, the projection 26 comes into engagement with the recess 28 and remains there during operation of the engine. This condition is illustrated in FIG. 6.

Thus, the base circle 23a of the decompression cam 23 is kept at the higher position than the base circle 22b of the compression stroke portion 22c of the exhaust valve motion cam 22 when urged to that position under the influence of the spring 29. Once the spring force is overcome by the centrifugal force of the weight 23b, the projection 26 will come to be positioned in the recess 28 after the compresson stroke when the camshaft 18 reaches a point where the decompression cam 23 is not acting against the cam follower 16b. When the cam follower 16b is no longer engaging the cam 23 to hold the projection 26, the recess 28 will move to displace the projection 26 from the shoulder 30 and the weight 23b can draw the cam 23 into its retracted, engine running condition.

Following the first compression stroke of the engine when starting, angular momentum of the engine can be achieved to improve the starting performance of the engine. Once the camshaft 18 is rotating, the decompression mechanism becomes positioned for normal operation such that it does not interfere with the normal operation of the exhaust valve motion cam 22.

Accordingly, the decompression device of this embodiment is capable of reducing such a system to a minimum number of parts allowing for easy assembly and maintenance. As the decompression device operates positively and automatically, it also improves ease of starting. By doing so, the size of the starter system may be reduced and kick or crank starting is facilitated as well.

In the foregoing embodiment, the decompression cam is shown to cooperate with the exhaust valve motion cam. However, it also could be provided adjacent the inlet valve motion cam to operate in a similar manner. Naturally, the shape of the weight portion provided on the decompression cam is not limited to that appearing like the lift portion of the main cam. Further, multiple types of engine configurations such as DOHC engines as well as SOHC engines can effectively employ the device.

Figure 7:
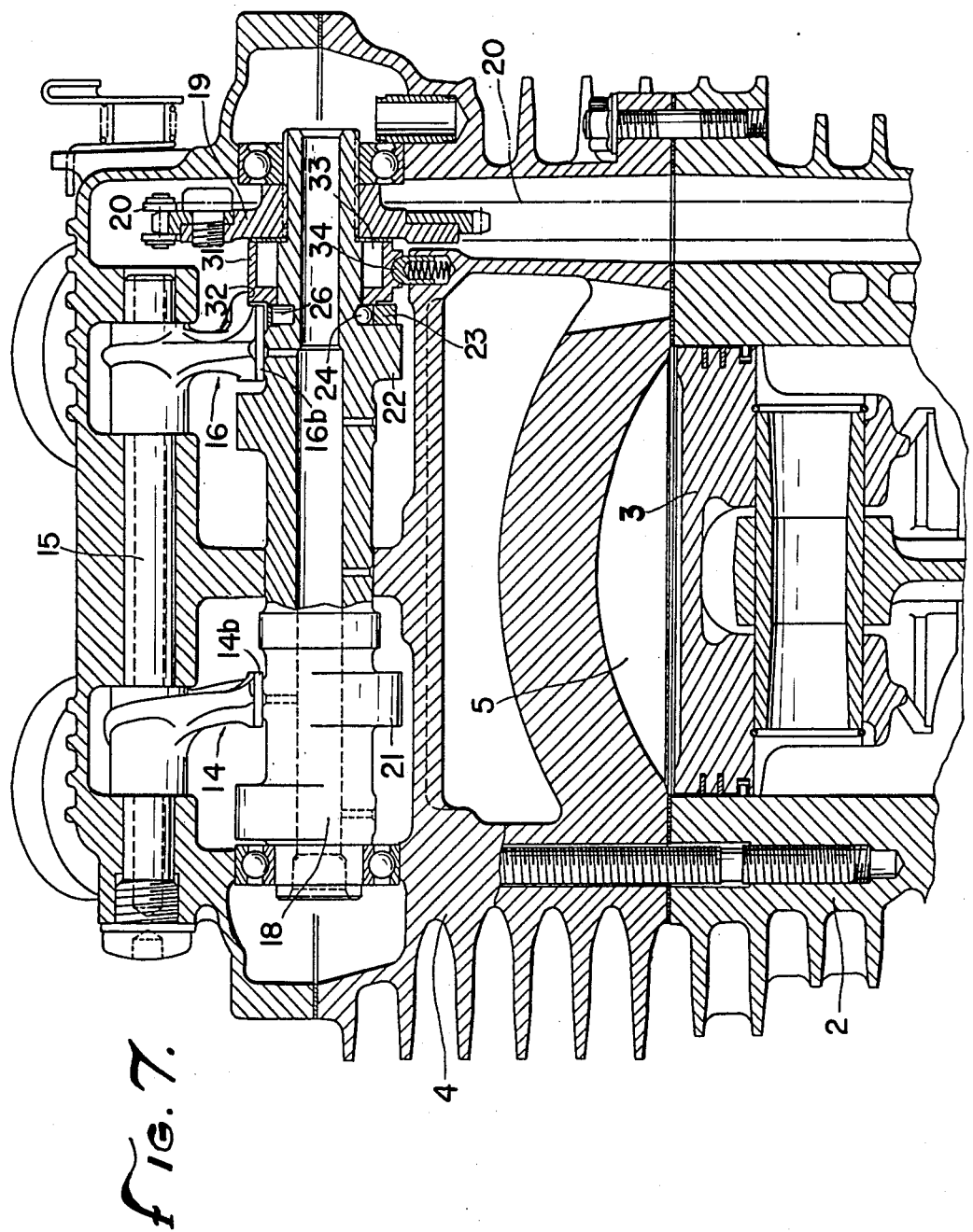
FIG. 7 is a cross-sectional elevation of an engine of a second embodiment.
Figure 8:
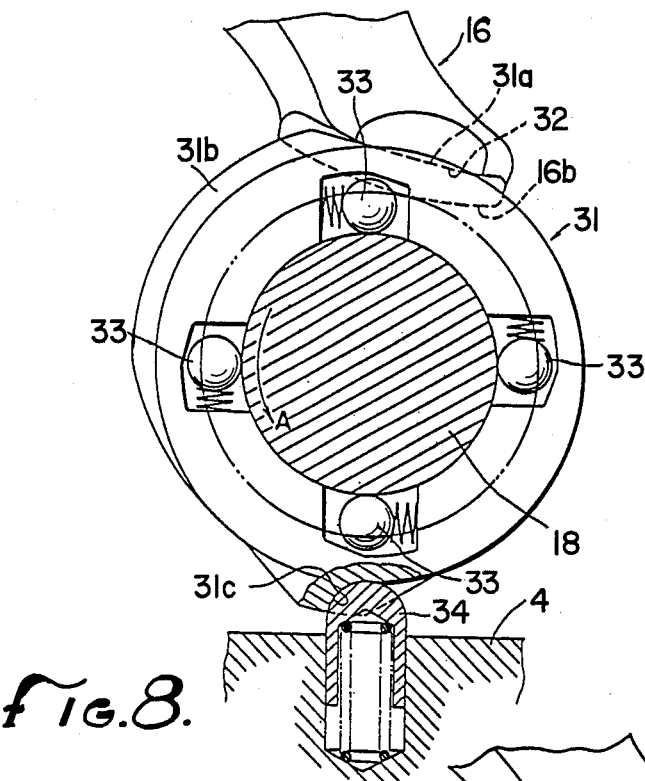
FIG. 8 is a side view of a reverse, decompression cam of the embodiment of FIG. 7 illustrated with the camshaft in transverse section.
Figure 9:
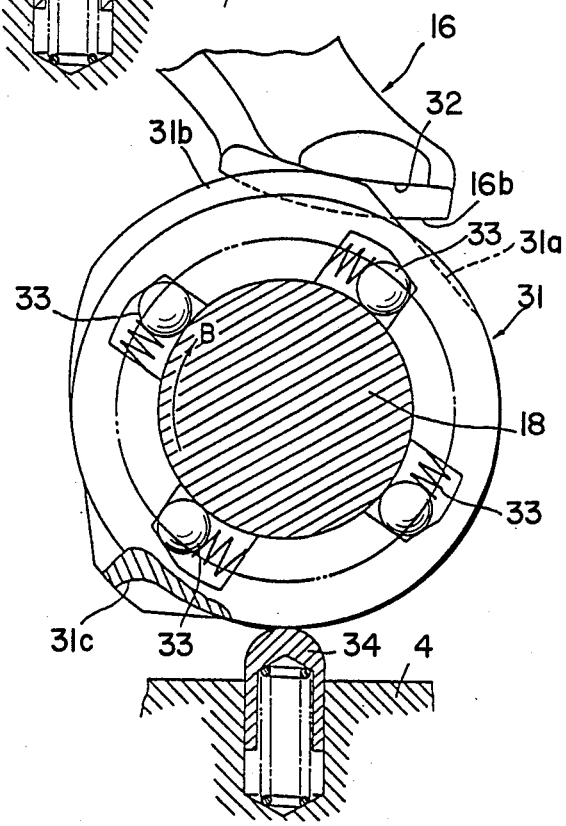
FIG. 9 is the same view as in FIG. 8 with the reverse, decompression cam in an actuated position.

Turning to the embodiment of FIGS. 7 through 9, similar reference numbers denote similar components. Attention is directed to a reverse decompression cam 31 positioned adjacent the decompression cam 23. A second cam follower surface 32 is formed adjacent the primary cam follower 16b to face the reverse, decompression cam 31.

Looking to FIGS. 8 and 9, greater detail is provided. The reverse, decompression cam 31 is rotatably supported on the camshaft 18. On the inner periphery of the reverse, decompression cam 31, a one-way clutch 33 is arranged between the camshaft 18 and the reverse, decompression cam. The clutch is arranged such that when the camshaft 18 rotates in reverse, the clutch is engaged to rotate the reverse, decompression cam therewith. On the outer periphery of the reverse, decompression cam is a low cam surface portion 31a which abuts against the second surface 32 of the cam follower 16b. This position is illustrated in FIG. 8 and exists when the camshaft 18 is rotating in the direction of arrow A. A cam lift surface 31b projects outwardly relative to the low cam surface 31a and extends from adjacent the low cam surface 31a. A one-way stop 31c also projects outwardly from the reverse, decompression cam 31.

When the camshaft 18 rotates normally, indicated by arrow A in FIG. 8, the reverse, decompression cam 31 is urged in the same direction until the one-way stop 31c engages a stopper 34. The stopper 34 has a rounded head and is spring loaded so as to allow resilient operation if necessary. With the one-way stop 31c against the stopper 34, the camshaft 18 continues to rotate with the low cam surface 31a positioned adjacent the cam follower 16b. Under this condition, the reverse, decompression cam 31 does not in any way influence the operation of the valve mechanism. When the camshaft 18 is reversed, in the direction of arrow B seen in FIG. 9, the one-way clutch 33 is engaged and the reverse, decompression cam 31 rotates with the camshaft 18. This moves the reverse, decompression cam 31 to the lift surface 31b which in turn lifts the cam follower 16b.

When operating the engine, the camshaft 18 is rotated in the direction as shown by arrow A in FIG. 8. Accordingly, the one-way clutch 33 is not actuated and the reverse, decompression cam 31 abuts against the stopper 34. As stated above, in this position, the low cam surface portion 31a is adjacent the cam follower 16b and does not interfere with the operation thereof.

When the engine is stopped, the piston may ultimately stop due to the resistance of the compression pressure of the gases in the combustion chamber 5. When this occurs, the motion of the piston may momentarily reverse to relieve the compression within the combustion chamber 5. This reversal is illustrated in FIG. 9 with the camshaft 18 rotating through a small angle in the direction of arrow B. Under such circumstances, the one-way clutch 33 is engaged to rotate the reverse, decompression cam 31 to a point where the lift surface 31b comes to engage the second surface 32 on the cam follower 16b. This further reduces the compression pressure within the combustion chamber 5.

When the engine is started following such a reverse rotation of the camshaft 18, the camshaft again is driven in the direction of the arrow A. The one-way clutch 33 disengages and the reverse, decompression cam 31 moves until the one-way stop 31c is engaged with the stopper 34. At this point, the reverse, decompression cam does not rotate further. This position is maintained during driving of the engine. As may occur with continued rotation of the engine under starting conditions, the decompression cam mechanism 23 may then operate to release pressure from the subsequent compression stroke prior to starting as described above.

Thus, an improved auto-decompression device is disclosed in each embodiment. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A valve control device for an engine having a combustion chamber, a valve controlling communication with said chamber, a camshaft rotatably mounted in said engine, a valve motion cam fixed to said camshaft for rotation therewith, and a valve actuation mechanism including a cam follower engageable with said valve motion cam, said valve control device comprising:
    a decompression cam carried by said camshaft axially adjacent said valve motion cam, said decompression cam including a base circle portion defining an outer peripheral surface smaller in radial extent than the outer peripheral surface of said valve motion cam and having an inner bore to loosely encircle said camshaft;
    means for adjusting the position of said decomposition cam with respect to said camshaft between two locations including a first location on which said outer peripheral surface of said decompression cam extends radially outwardly from the axis of said camshaft to an extent greater than that of said valve motion cam to engage said cam follower for decompression operation of said valve, and a second location at which said outer peripheral surface of said decompression cam extends radially outwardly from the axis of said camshaft to an extent less than that of said valve motion cam whereby said valve motion cam engages said cam follower for normal operation of said valve; and
    means responsive to the rotational speed of said camshaft for automatically moving said decompression cam between said first and second locations.

2. The valve control device according to claim 1 in which said decompression cam moving means comprises an eccentric weighted portion of said decompression cam for moving said decompression cam by centrifugal action between said two locations.

3. The valve control device according to claim 1 in which said two locations are in mutual angularly spaced relation about the periphery of said decompression cam and said adjusting means includes a recess containing angularly spaced, radially stepped portions on said decompression cam inner bore and means fixed to said camshaft for engaging the respective portions of said recess with said decompression cam in each of the respective two locations.

4. The valve control device according to claim 3 including spring means between said camshaft and said decompression cam inner bore for normally biasing said decompression cam into said first location.

5. The valve control device according to claim 4 in which said decompression cam moving means comprises an eccentric weighted portion of said decompression cam for moving said decompression cam into said second location by centrifugal action directed in opposition to the biasing force of said spring means.

6. The valve control device according to any one of claims 1 through 5 including means for rotationally interlocking said decompression cam with respect to said camshaft while permitting restricted relative angular and radial displacement therebetween.

7. The valve control device according to claim 6 wherein said interlocking means comprises pivot means oppositely spaced from said recess and connecting said decompression cam inner bore to said camshaft for restricted angular and radial displacement of said decompression cam with respect to said camshaft.

8. The valve control device according to claim 7 wherein said pivot means comprises opposed recesses on said decompression cam inner bore and said camshaft and an interlocking element positioned in said recesses.

9. The valve control device according to claim 7 wherein said interlocking element is spherically formed.

10. The device of claim 1 further comprising:
    a reverse, decompression cam rotatably mounted on the camshaft and having a second outer peripheral surface facing the cam follower;
    a one-way clutch between said reverse, decompression cam and the camshaft, said second outer peripheral surface of said reverse, decompression cam having a first portion extending radially outwardly of the valve motion cam and a second portion being smaller in radial extend than the valve motion cam and a one-way stop acting in the opposite rotation to said one-way clutch.

11. The device of claim 10 wherein said stop is arranged to stop said reverse, decompression cam with said second portion facing the cam follower.

12. A valve control device for an engine having a combustion chamber, a valve controlling communication with said chamber, a camshaft rotatably mounted in said engine, a valve motion cam fixed to said camshaft for rotation therewith, and a valve actuation mechanism including a cam follower engageable with said valve motion cam, said valve control device comprising:
    a decompression cam carried by said camshaft axially adjacent said valve motion cam, said decompression cam including a base circle portion defining an outer peripheral surface smaller in radial extent than the outer peripheral surface of said valve motion cam and having an inner bore to loosely encircle said camshaft, said decompression cam being eccentrically pivotable with respect to the axis of said camshaft for adjusting the position of said decompression cam with respect to said camshaft between two locations including a first location on which said outer peripheral surface of said decompression cam extends radially outwardly from the axis of said camshaft to an extent greater than that of said valve motion cam to engage said cam follower for decompression operation of said valve, and a second location at which said outer peripheral surface of said decompression cam extends radially outwardly from the axis of said camshaft to an extent less than that of said valve motion cam whereby said valve motion cam engages said cam follower for normal operation of said valve.

13. The valve control device according to claim 12 wherein said decompression cam is pivotable by opposed recesses on said decompression cam inner bore and said camshaft and an interlocking element positioned in said recesses.

14. The valve control device according to claim 13 wherein said interlocking element is spherically formed.

* * * * *